US009635188B1

(12) United States Patent
Bradley et al.

(10) Patent No.: US 9,635,188 B1
(45) Date of Patent: Apr. 25, 2017

(54) MOBILE DEVICE DATA ALLOCATION SYSTEM

(71) Applicant: International Business Machines Corporation, Armonk, NY (US)

(72) Inventors: Lisa M. Bradley, Cary, NC (US); Brian O'Donovan, Dublin (IE); Aaron J. Quirk, Cary, NC (US); Lin Sun, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/927,646

(22) Filed: Oct. 30, 2015

(51) Int. Cl.
*H04M 11/00* (2006.01)
*H04J 1/16* (2006.01)
*H04M 15/00* (2006.01)

(52) U.S. Cl.
CPC ........... *H04M 15/60* (2013.01); *H04M 15/58* (2013.01); *H04M 15/765* (2013.01); *H04M 15/853* (2013.01); *H04M 15/887* (2013.01)

(58) Field of Classification Search
CPC ..................................................... H04L 63/08
USPC ........ 455/407, 454, 566, 411, 428; 370/328, 370/235, 345, 331, 338
See application file for complete search history.

(56) References Cited

U.S. PATENT DOCUMENTS

| | | | |
|---|---|---|---|
| 8,539,040 B2 | 9/2013 | Luna et al. | |
| 8,582,457 B2 | 11/2013 | Leemet et al. | |
| 2007/0099609 A1* | 5/2007 | Cai | ..................... H04L 41/5054 455/428 |
| 2010/0067382 A1* | 3/2010 | Kobayashi | .............. H04L 41/12 370/235 |
| 2013/0196615 A1 | 8/2013 | Zalmanovitch et al. | |
| 2013/0196617 A1 | 8/2013 | Zalmanovitch et al. | |
| 2013/0196626 A1 | 8/2013 | Zalmanovitch et al. | |
| 2014/0032468 A1 | 1/2014 | Anandaraj | |
| 2016/0095017 A1* | 3/2016 | Ely | ..................... H04L 61/6022 455/454 |

* cited by examiner

*Primary Examiner* — Kiet Doan
(74) *Attorney, Agent, or Firm* — Cantor Colburn LLP; Richard Wilhelm

(57) ABSTRACT

A mobile device data allocation system includes a plurality of mobile devices that exchange data with a data service provider via a communication network. The data exchanged by each mobile device during a time period defines a total amount of exchanged data. An electronic shared-account device module is configured to determine a maximum amount of data at which the mobile devices are authorized to exchange during the time period. The shared-account device module further generates a control signal that regulates data exchange of the at least one mobile device in response to determining an upcoming event indicating the total amount of exchanged data will exceed the maximum amount of data.

17 Claims, 6 Drawing Sheets

MOBILE DEVICE DATA ALLOCATION SYSTEM

BACKGROUND

The present invention relates to mobile devices, and more specifically, to shared data plans including a plurality of mobile devices.

Mobile device carriers are increasingly offering plans in which users are charged by data usage instead of voice or SMS usage. For example, a user may pay for a predetermined amount of data usage, (e.g., 10 GB) per month. Any amount of data over the monthly data allotment (e.g., 10 GB) is charged a premium overage fee.

Many data plans are structured as shared accounts or "family plans" where data allotment is shared among members of a family or specified group. Accordingly, all members of the shared account draw from the same pool of data. In a shared data environment, it is easy to exceed the allocated data amount of the account since users cannot always know the data usage of other members assigned to the shared account at a given time.

SUMMARY

According to a non-limiting embodiment, a mobile device data allocation system includes a plurality of mobile devices that exchange data with a data service provider via a communication network. The data exchanged by each mobile device during a time period defines a total amount of exchanged data. An electronic shared-account device module is configured to determine a maximum amount of data at which the mobile devices are authorized to exchange during the time period. The shared-account device module further generates a control signal that so as to regulate data exchange of the at least one mobile device in response to determining an upcoming event indicating the total amount of exchanged data will exceed the maximum amount of data.

According to another non-limiting embodiment, a mobile device included in a shared data account comprises an electronic hardware processor configured to control data exchange to and from the mobile device via a communication network. The communication network is controlled by a data service provider that provides the shared data account with a maximum amount of data available for exchanging during a time period. An electronic shared-account device module is configured to generate a control signal that controls the electronic hardware processor so as to regulate the data exchange in response to determining an upcoming event that indicates a total amount of data exchanged by at least one mobile device assigned to the shared data account will exceed the maximum amount of data.

According to yet another non-limiting embodiment, a computer program product controls a mobile device data allocation system so as to regulate data exchange of at least one mobile device assigned to a shared data account. The computer program product comprises a computer readable storage medium having program instructions embodied therewith. The program instructions are executable by an electronic computer processor such that the mobile device data allocation system exchanges data via a plurality of mobile devices in signal communication with a data network controlled by a data service provider. The data exchanged during a time period defines a total amount of exchanged data. The program instructions further instruct the mobile device data allocation system to determine a maximum amount of data at which the plurality of mobile devices are authorized to exchange during the time period, and to control at least one mobile device among the plurality of devices so as to regulate data exchange of the at least one mobile device in response to determining an upcoming event indicating the total amount of exchanged data will exceed the maximum amount of data.

Additional features are realized through the techniques of the present invention. Other embodiments are described in detail herein and are considered a part of the claimed invention. For a better understanding of the invention with the features, refer to the description and to the drawings.

DETAILED DESCRIPTION

Since shared data accounts are susceptible to data usage above the predetermined allocated data amount of the account since users it is beneficial to notify all users of the current data usage at a given time. In addition, shared accounts may provide challenges since each user may not be aware of another user's need for additional data at a future date. Therefore, a gap exists in coordinating data usage amongst a group of devices when one of the devices has a known high data usage period in the future.

Various embodiments provide a mobile device data allocation system configured to coordinate data usage among a group of devices included in a shared data account based on a known or predicted increase in data usage at a future point in time. In at least one embodiment, the system analyzes metadata, usage history data and/or data transmission trends corresponding to respective devices assigned to the shared data account to determine whether an increase in data usage is expected in the future.

The system is also configured to communicate the requirements for data transmission regulation and/or upcoming data transmission regulation events to the other devices to offset the usage increase and/or prioritize the data usage assigned to devices included in the shared data plan. In this manner, the possibility of exceeding the total available data usage allocated to the shared data plan may be avoided. In at least one embodiment, core logic configured to perform various processes including, but not limited to, trend analysis, data usage spike prediction, and data throttling calculations, resides in a distributed cloud computing environment or cloud service network. The cloud service network has access to the data service provider data usage history corresponding to shared account. In addition, the cloud service network has access to various third party applications stored on each mobile device, and may gain access to the third party accounts via an agent service or application (app) installed on a respective mobile device.

Figure 1:
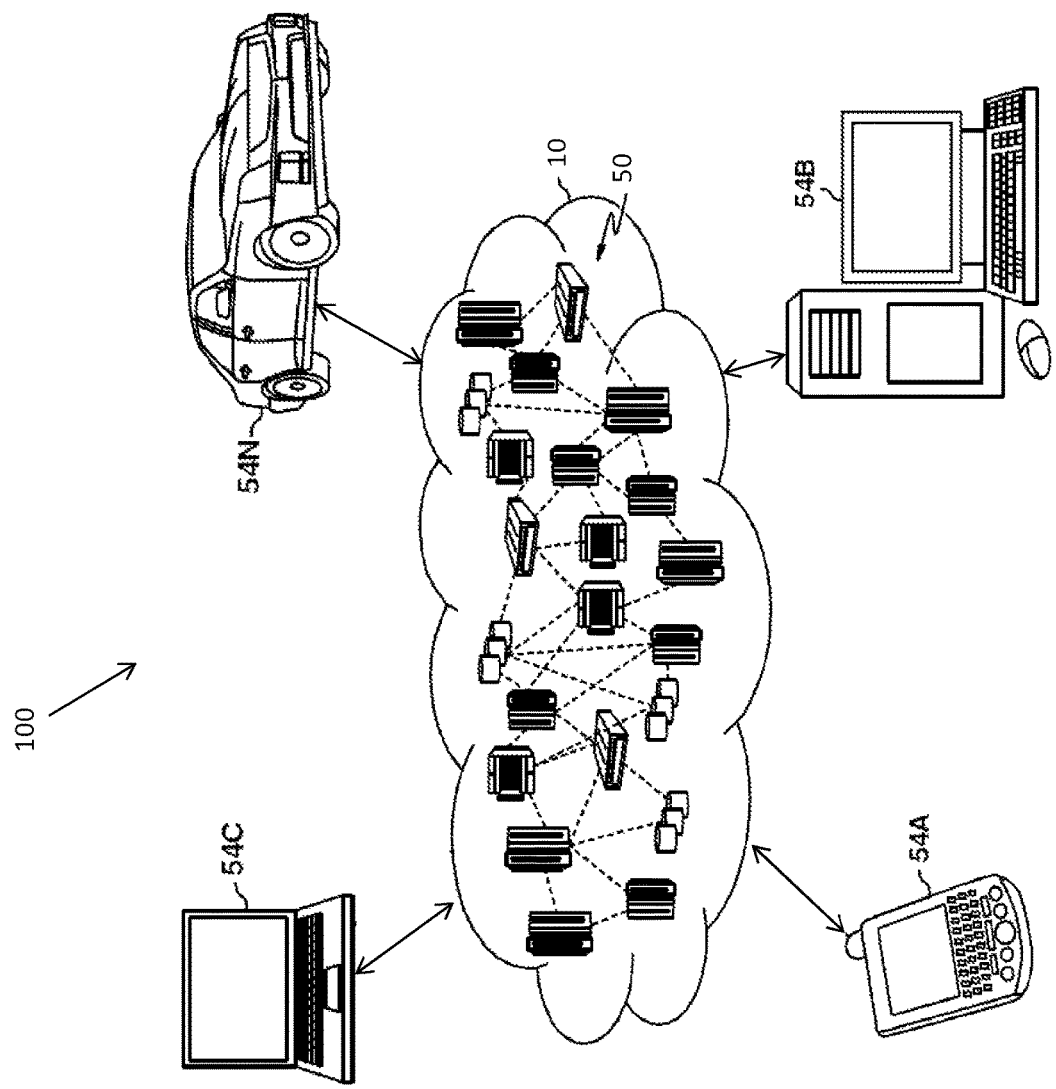
FIG. 1 illustrates a cloud computing environment capable of supporting core logic included in a mobile device data allocation system according to a non-limiting embodiment.

With reference now to FIG. 1, a cloud computing environment 10 capable of supporting a mobile device data allocation system 100 is illustrated according to a non-limiting embodiment. As shown, cloud computing environment 10 comprises one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. The nodes 50 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 54A-N shown in FIG. 2 are intended to be illustrative only and that computing nodes 50 and cloud computing environment 10 can communicate with any type of computerized device over any type of network and/or network addressable connection (e.g., using a web browser).

Figure 2:
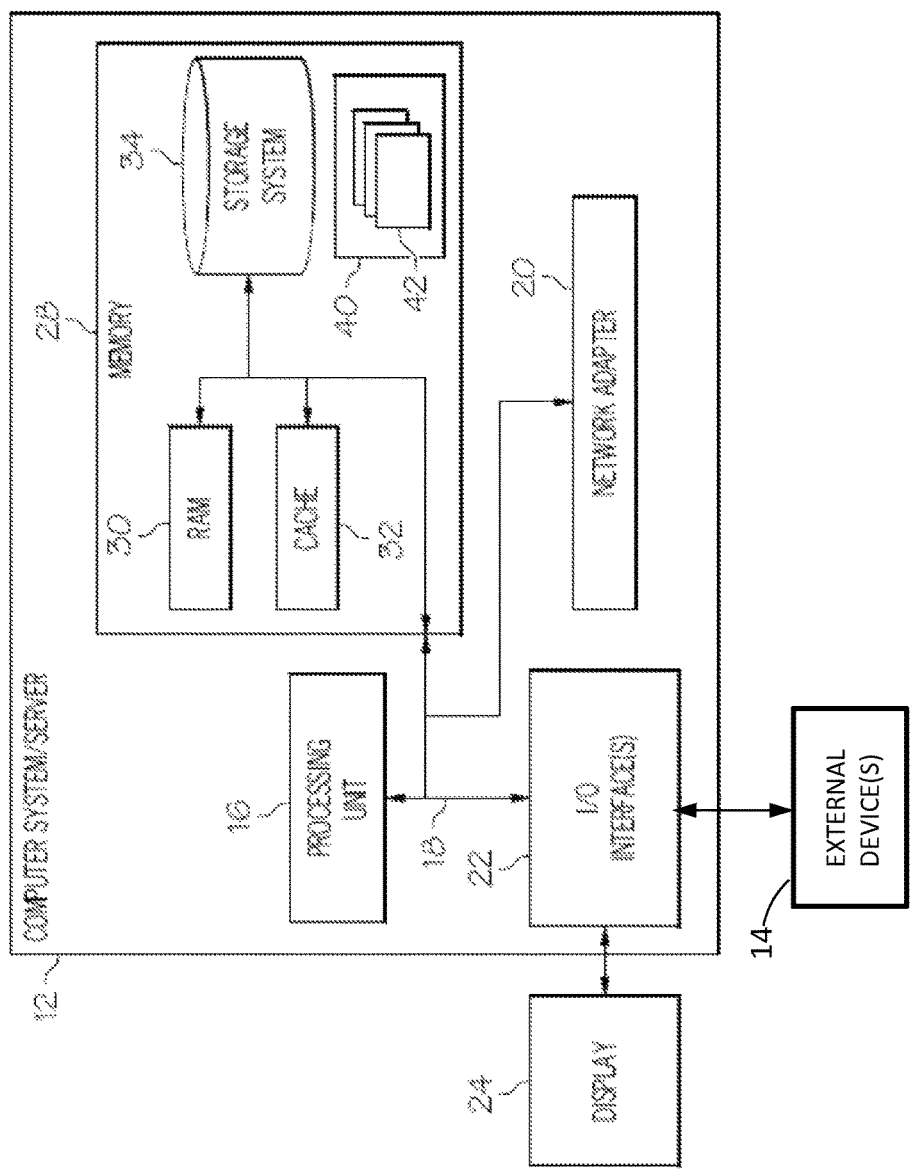
FIG. 2 is a schematic diagram of a cloud computing node included in a distributed cloud environment.

Referring now to FIG. 2, a schematic of a cloud computing node 50 included in a distributed cloud environment or cloud service network is shown according to a non-limiting embodiment. The cloud computing node 50 is only one example of a suitable cloud computing node and is not intended to suggest any limitation as to the scope of use or functionality of embodiments of the invention described herein. Regardless, cloud computing node 50 is capable of being implemented and/or performing any of the functionality set forth hereinabove.

In cloud computing node 50 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 50 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
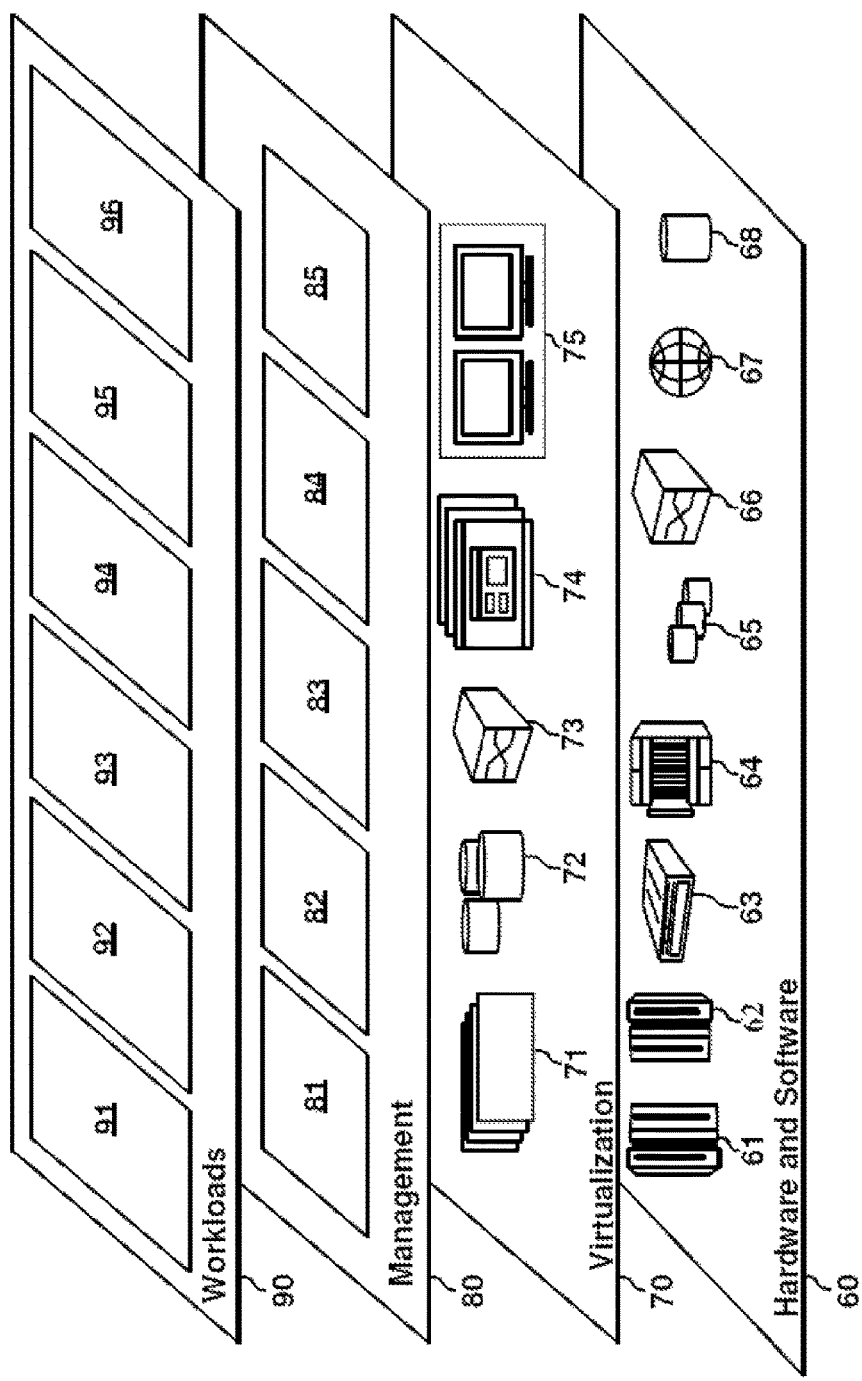
FIG. 3 is a set of functional abstraction layers provided by a cloud computing environment capable of supporting core logic included in a mobile device data allocation system according to a non-limiting embodiment.

Referring now to FIG. 3, a set of functional abstraction layers provided by cloud computing environment 10 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provided pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Although a cloud environment capable of supporting the core logic of the data service network system 102 is described in detail above, it should be appreciated that the core logic of the data service network system 102 can reside locally on one or more of the devices 54A-54N. For instance, each mobile device 54A may have installed locally thereon the core logic of the data service network system 102. In this manner, the mobile devices 54 can perform locally the various features and operations of the data service network system 102.

Figure 4:
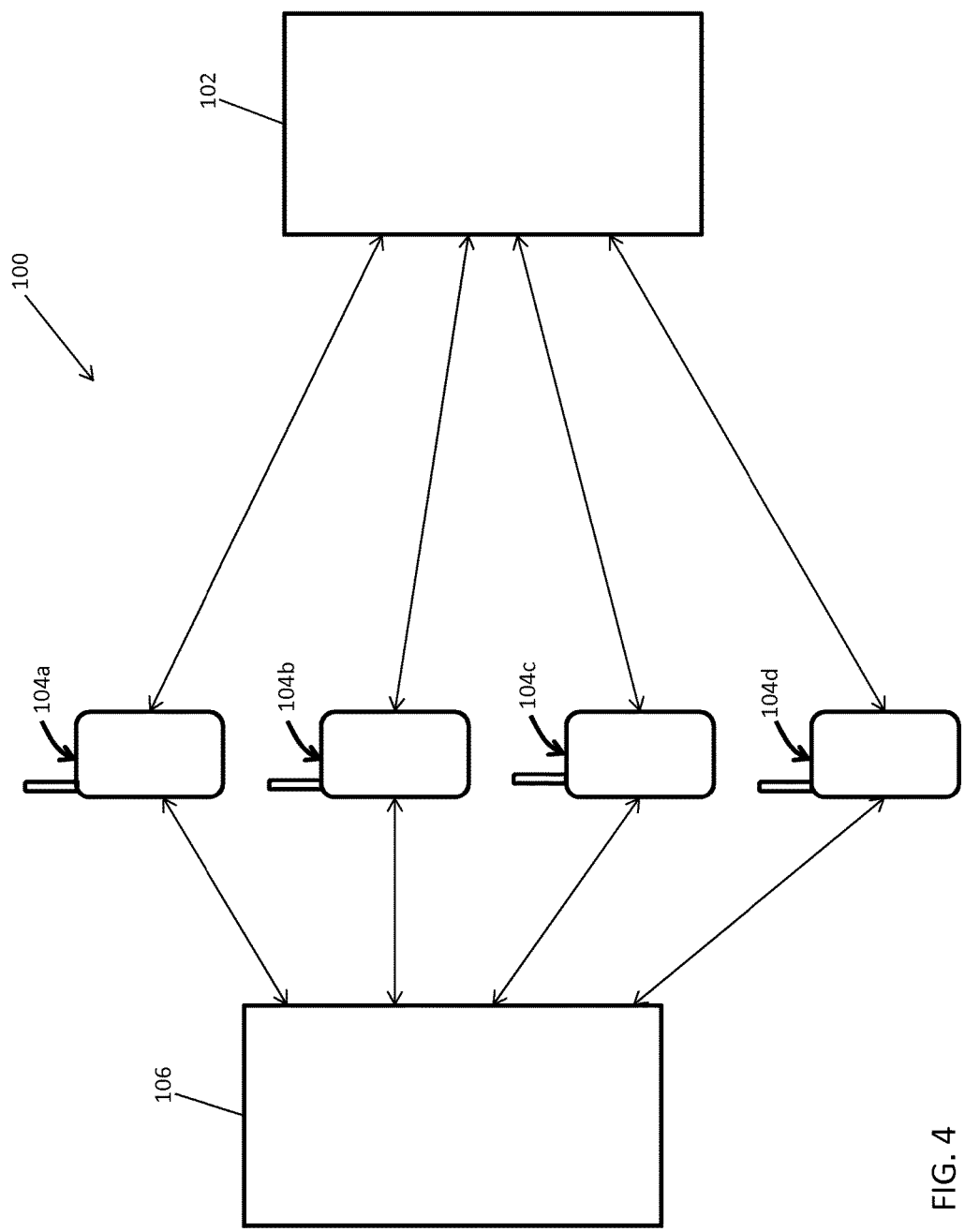
FIG. 4 is a block diagram of a mobile device data allocation system according to a non-limiting embodiment.

Turning now to FIG. 4, a mobile device data allocation system 100 is illustrated according to a non-limiting embodiment. The mobile device data allocation system 100 includes a data service network system 102, a plurality of mobile devices 104a-104d, and an electronic shared-account device module 106. The data service network system 102 provides network access, bandwidth, and data to facilitate data transmission of the mobile devices 104a-104d as understood by one of ordinary skill in the art.

The mobile devices 104a-104d are designated to a shared account. In turn, the data service network system 102 allocates a predetermined amount of data for transition (e.g., upload and/or download) to the shared account, which is then shared among each mobile device 104a-104d. As one or more mobile devices 104a-104d transmits data, the data service network system 102 monitors the total consumption of data from the shared account. When total consumptions of the data exceeds the predetermined data allotment of the shared account, the data service network system 102 may apply various overage penalties to the shared account including, but not limited to, monetary overage penalty fees.

The shared-account device module 106 is in signal communication with each mobile device 104a-104d included in the shared account. In at least one embodiment, the shared-account device module 106 analyzes operation of the mobile devices 104a-104d, various metadata associated with a respective mobile device 104a-104d and/or historical data usage or trends to determine whether an increase in data usage is currently in effect and/or whether an increase in data usage is expected in the future. The metadata analyzed by the shared-account device module 106 includes, but is not limited to, calendar applications, purchase information (e.g. travel purchases, etc.), email accounts, and short message server (SMS) or other messaging accounts. The data usage history or trend data can be provided from each respective mobile device 104a-104d and/or the data service network system 102. In at least one embodiment, the shared-account device module 106 compensates for anticipated spike(s) in data usage by controlling and regulating the data transmission of one or more of the mobiles devices before the spike in data usage occurs. Regulations of the data transmission may include, for example, throttling the data transmission of one or more mobile devices 104a-104d before the data spike occurs. In this manner, a particular mobile device 104a-140d may operate according increased data transmissions without exceeding the data allotment of the shared account.

Figure 5:
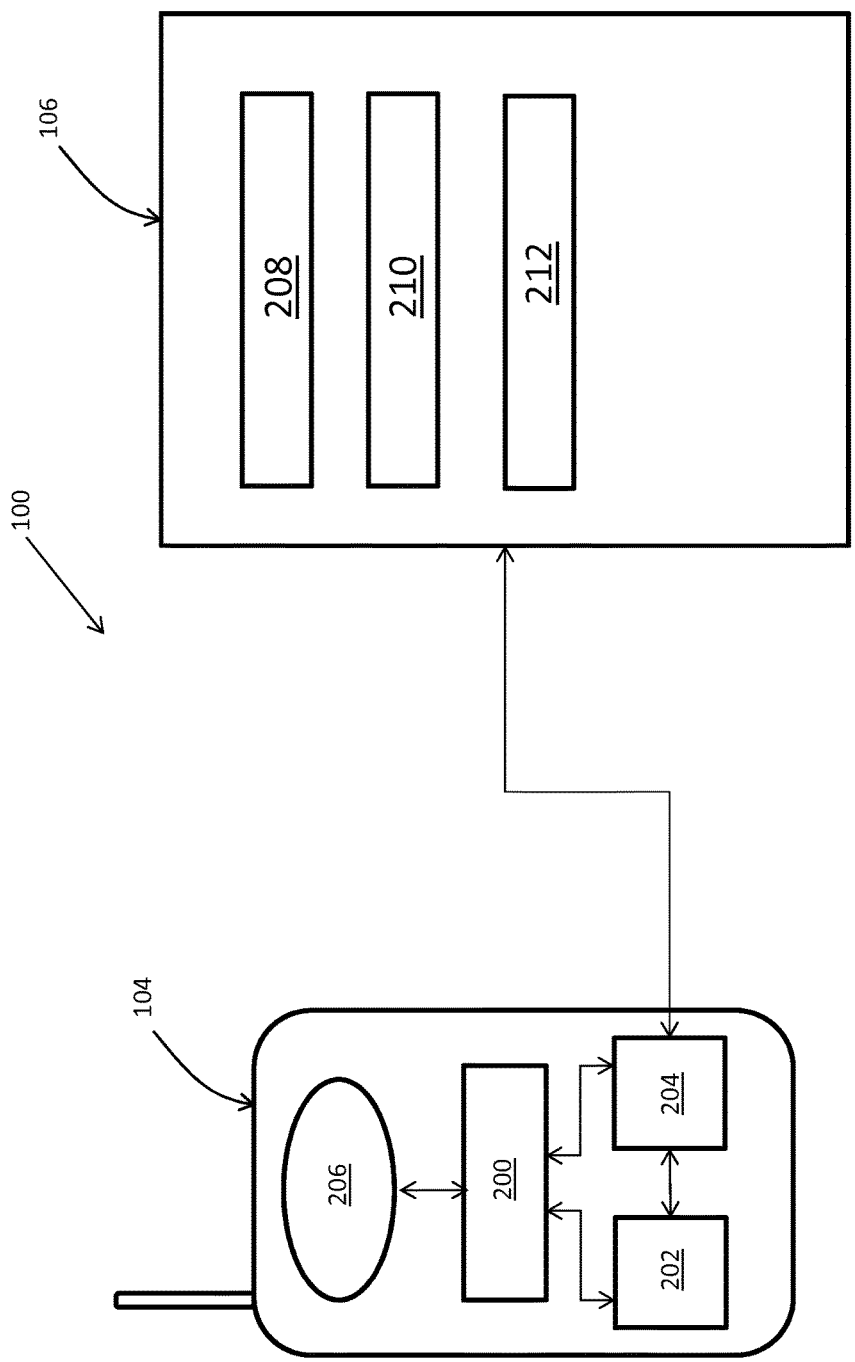
FIG. 5 is a block diagram illustrating a shared-account device module in signal communication with a mobile device among a plurality of mobile devices included and included in a mobile device data allocation system according to a non-limiting embodiment.

Turning now to FIG. 5, a shared-account device module 106 is illustrated in signal communication with a mobile device 104 among a plurality of mobile devices included in a mobile device data allocation system 100 according to a non-limiting embodiment. The mobile device 104 includes an electronic device control module 200, a metadata storage unit 202, and a data relay module 204. The device control module 200 controls various operations of the mobile device 104 including, but not limited to, execution of software applications, data communication, display of data or user interfaces on a display unit 206, etc. The metadata storage unit 202 is configured to store metadata and/or usage history data. The metadata includes, but is not limited to, calendar entry events, stored work tasks, purchase information (e.g., travel purchases, etc.), email messages, and short message server (SMS) messages or other text message-based data. The usage history data includes, but is not limited to, accumulated amount of data used by the mobile device 104 during a time period (e.g., a billing period, per day, or over the last year), and past data usage spike events. The data relay module 204 retrieves metadata and/or usage history data from the metadata storage unit 202 and relays the retrieved data to the shared-account device module 106.

Based on the metadata and/or data usage history, the shared-account device module 106 performs analysis to determine whether to regulate data transmission of one or more mobile devices 104 as described in greater detail below.

The shared-account device module 106 includes a family account database 208, an electronic metadata analysis module 210, and an electronic data transmission regulation module 212. The family account database 208 stores data and information identifying the mobile devices included in the shared account, and the users corresponding to a respective mobile device.

The family account database 208 also stores various metadata and historical data usage corresponding to each mobile device 104 assigned to the shared account. The metadata can be retrieved from each mobile device 104 and includes, but is not limited to, calendar application data (e.g., future events, appointments, tasks, dinner reservations, etc.), purchase information (e.g., airline tickets, hotel reservations, transportation purchases, etc.), email messaging data, and texting messaging data (SMS data, instant messaging data, etc.).

The historical data usage includes, but is not limited to, accumulated amount of data used by the mobile device 104 during a time period (e.g., a billing period, per day, or over the last year), and past data usage spike events. The historical data usage may be retrieved from each mobile device 104 and/or may be provided by a network data service provider (not shown in FIG. 4). In this manner, the family account database 208 may store an expected data usage baseline value (Ub) for one or more mobile devices 104 assigned to the shared account.

The metadata analysis module 210 is configured to perform various processes and computations so as to identify one or more upcoming user events that may cause an increase in consumption of the available data allocated to the shared account. In at least one embodiment, the metadata analysis module 210 can determine an upcoming user event based on an entry stored in the family account database 208, and based on the user event determines the likelihood of increased data usage at a future point in time. A future user event may include, but is not limited to, an upcoming travel event, an upcoming social event, an upcoming work event, etc.

For instance, the metadata analysis module 210 may extract information from an email message or calendar entry indicating that a user of a particular mobile device 104 has schedule an upcoming travel event at a future date. The analysis module 210 may then retrieve usage history from the family account database 208 indicating that data usage increased during a previous travel event conducted by the user of the same mobile device 104. Accordingly, the metadata analysis module 210 logically determines that data usage will likely increase at the future date or dates corresponding to the upcoming travel event. Although a travel event has been described above as an example, it should be appreciated that the metadata analysis module 210 may determine various other types of events based on the data stored in the family account database 208.

According to another example, the metadata analysis module 210 may determine the user of a particular mobile device 104 intends to attend a music concert based on concert ticket purchase data extracted from an email confirmation. The analysis module 210 may then retrieve usage history from the family account database 208 indicating that image uploading and/or video streaming usage (thus data consumption) increased during a previous concert event conducted by the user of the same mobile device 104. Accordingly, the metadata analysis module 210 logically determines that that data usage will again likely increase at the future date or dates corresponding to the upcoming concert event. In this manner, the metadata analysis module 210 is capable of determining data usage trends corresponding to a particular mobile device based on a correlation of previous usage history associated with similar past events, and is capable of predicting data usage at future dates based on the data usage trends. In at least one embodiment, the metadata analysis module 210 is configured to determine an expected increased data usage (Ui) based on a similar previous event. If multiple similar events exist, the metadata analysis module 210 may determine the UI as an average data usage value.

The data transmission regulation module 212 is configured to regulate data usage (i.e., consumption of the data allotted to the shared account) based on the Ub and the Ui. According to a non-limiting embodiment, the data transmission regulation module 212 calculates a usage threshold value ($U_{TH}$) where data usage in excess of $U_{TH}$ is determined to be significant. When the data transmission regulation module 212 determines a new event exists corresponding to a Ui, the data transmission regulation module 212 compares Ui to Ub+$U_{TH}$. When Ui exceeds Ub+$U_{TH}$, the data transmission regulation module 212 determines that the particular mobile device 104 corresponding to the Ui is expected to cause a significant consumption of data during a corresponding future event or future time period.

In at least one embodiment, the data transmission regulation module 212 predicts an increased data consumption that is expected during the future event or future time period, and compares the predicted increased data consumption with the allotted data remaining in the shared account. Based on the comparison and the time period remaining in the current billing cycle, the data transmission regulation module 212 computes an amount of data that should be reserved in order to avoid exceeding the maximum available data allotted to the shared account. In at least one embodiment, the data transmission regulation module 212 may determine that exceed the current month's maximum allotted amount of data is unavoidable. In this case, the data transmission regulation module 212 alerts each mobile device 104 assigned to the shared data account (e.g., controls each mobile device 104 to vibrate) that the current month's maximum allotted amount of data will be exceeded regardless of regulating the data transmission or data consumption of one or more mobile devices 104. Accordingly, users of the mobile devices 104 can take appropriate action (e.g., reduced data transmission) so as to mitigate overage fees.

If a future user event is subsequently cancelled, the metadata analysis module 210 can alert the data transmission regulation module 212. In this manner, the data transmission regulation module 212 can dynamically reconfigured the amount of data that should be reserved for a particular billing period.

According to a non-limiting embodiment, the data transmission regulation module 212 can determine how to regulate the data transmission of one or more mobile devices 104 assigned to the shared account in order to achieve the computed reserved data necessary to avoid exceeding the maximum available data allotted to the shared account. For instance, upon computing the reserved data amount, the data transmission regulation module 212 is configured to dynamically compute a maximum amount of data each mobile device 104 is allowed to transmit or exchange (e.g., upload, download, stream, etc.) over the remaining period of the billing cycle. Based on the maximum data amounts of each mobile device 104 computed by the data transmission regulation module 212, the shared-account device module 106 may output one or more control signals to regulate the data transmission of one or more mobile devices 104 assigned to the shared account. For example, the control signals may regulate the data transmission of a mobile device 104 by throttling data transmission speeds, restricting data uploading and/or downloading, restricting data streaming, etc.

In at least one embodiment, each mobile device 104 designated to the shared account may be assigned a priority value. For instance, mobile devices assigned the highest priority may be excluded from data regulation, mobile devices 104 assigned an intermediate priority may be subject to data throttling or limited data transmission, while mobile devices 104 assigned the lowest priority may be blocked entirely from transmitting data. Thus, mobile devices 104 performing a majority of data transmission in accordance with entertainment use may be assigned the lowest priority while mobile devices 104 that perform a majority of data transmission in accordance with work and employment use is assigned the highest priority. According to a non-limiting embodiment, the data transmission regulation module 212 is configured to dynamically assign the priority values to the mobile devices 104 based on the usage history of each device 104. It should also be appreciated, however, that the priority values may be assigned manually to each mobile device 104 using an administrator or main user of the data service network system 102.

According to a non-limiting embodiment, the shared-account device module 106 outputs an alert control signal to one or more of the mobile devices 104 assigned to the shared account in response to the data transmission regulation module 212 determining a significant consumption of data is expected to occur during a corresponding future event or future time period (e.g., Ui exceeds $Ub+U_{TH}$). The alert control signal controls the respective mobile device 104 (e.g., commands to the controller 200) to generate one or more alerts indicating to the user that the respective mobile device 104 is currently undergoing data transmission regulation and/or will be subject to data transmission regulation during the future time period corresponding to Ui. The alerts may include, but are not limited to, an emitted light, an emitted sound, a graphical icon displayed on the display unit 206 and/or vibrating the mobile device 104. In this manner, the user of the respective mobile device 104 is notified of the data transmission regulation and can act accordingly.

Figure 6:
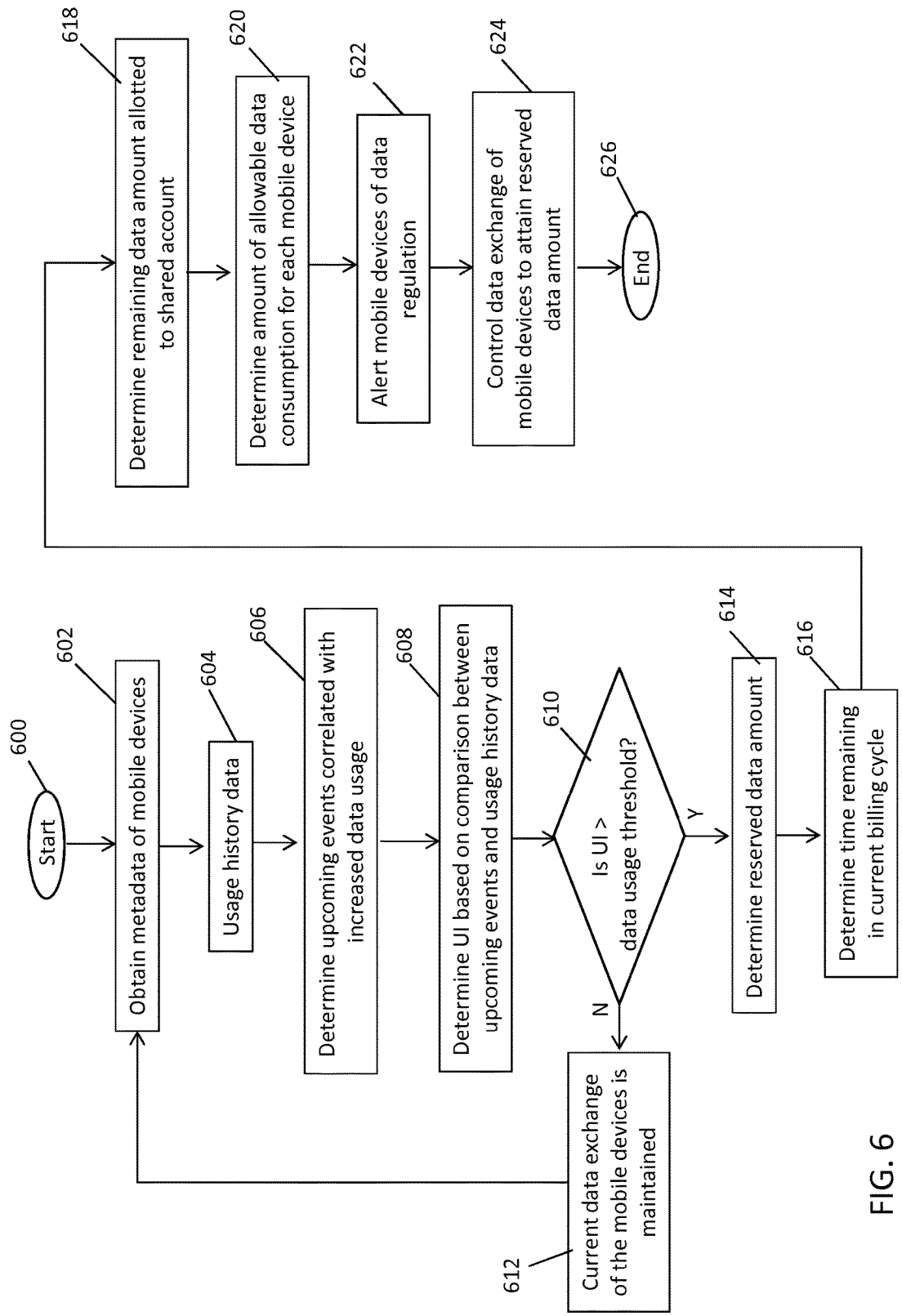
FIG. 6 is a flow diagram illustrating a method of controlling data transmission among a plurality of mobile devices included in a shared data plan network according to a non-limiting embodiment.

Referring now to FIG. 6, a flow diagram illustrates a method of controlling data transmission among a plurality of mobile devices included in a shared data plan network according to a non-limiting embodiment. The method begins at operation 600 and at operation 602 metadata corresponding to one or more mobile devices assigned to a shared data account is determined. The metadata includes, but is not limited to, calendar applications, purchase information (e.g. travel purchases, etc.), email accounts, and short message server (SMS) or other messaging accounts. At operation 604, usage history data of one or more mobile devices assigned to the shared data account is determined. The data usage history or trend data can be provided from each respective mobile device 104a-104d and/or the data service network system 102. The data usage history includes, but is not limited to, data consumption/transmission by each mobile device during a certain time period (per week, per month, per year), data usage at a past event (e.g., a past concert, past travel event, past work function), and data usage during various times of the day, the types of data usage performed at past events (e.g., image uploading, video streaming, music streaming, etc.). At operation 606, one or more upcoming events correlated with increased data usage are determined. At operation 608, an expected increased data usage (Ui) based on a similar previous event is determined. At operation 610, the Ui is compared to a threshold. When the Ui is less than or equal to the threshold, the current data transmission of the mobile devices is maintained, as shown at block 612. That is, data transmission regulation is not performed, and the method returns to operation 602 to continue obtaining metadata of the mobile devices.

When, however, the Ui exceeds the threshold at operation 610, a reserved data amount necessary to prevent exceeding the maximum allotted data of the shared account is determined at operation 614. At operation 616, the remaining time of the current billing cycle is determined, and at operation 618 the remaining amount of data allotted to the shared account is determined. At operation 620, an amount of allowable data consumption or amount of allowed data transmission for each mobile device assigned to the shared data account is determined. At operation 622, one or more mobile devices are alerted of an ongoing data transmission regulation process and/or of an upcoming data transmission regulation process. At operation 624, data transmission of one or more mobile devices assigned to the shared data account is controlled so as to attain the reserved data amount, and the method ends at operation 626. In this manner, the possibility of exceeding the total available data usage allocated to the shared data plan may be avoided.

As described in detail above, various embodiments provide a mobile device data allocation system configured to coordinate data usage amongst a group of devices included in a shared data account based on a known or suspected increase in data usage at a future point in time. In at least one embodiment, the system analyzes metadata corresponding to respective mobile devices assigned to the shared data account to determine whether an increase in data usage is expected in at a future time period. The system is also configured to communicate the requirements for data transmission regulation to the other devices to offset the usage increase and/or prioritize the data usage assigned to devices included in the shared data plan. In this manner, the possibility of exceeding the total available data usage allocated to the shared data plan may be avoided.

Various embodiments of the invention may be implemented as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A mobile device data allocation system, comprising:
a plurality of mobile devices configured to exchange data with a data service provider via a communication network controlled by a data service provider, the data exchanged by each mobile device during a time period defining a total amount of exchanged data; and
an electronic shared-account device module in signal communication with the mobile devices, the shared-account device module configured to determine a maximum amount of data at which the plurality of mobile devices are authorized to exchange during the time period, and to generate a control signal that controls at least one mobile device among the plurality of devices so as to regulate data transmission of the at least one mobile device in response to determining an upcoming event indicating the total amount of exchanged data will exceed the maximum amount of data;

wherein the shared-account device module determines the upcoming event based on at least one of metadata and data usage history of a respective mobile device among the plurality of mobile devices.

2. The mobile device data allocation system of claim 1, wherein the metadata indicates the upcoming event scheduled at a future time period, and wherein the shared-account device module predicts data transmission performed by the respective mobile device will increase during the upcoming event.

3. The mobile device data allocation system of claim 2, wherein the shared-account device module predicts the data transmission increase based on a comparison between the upcoming event and the data usage history.

4. The mobile device data allocation system of claim 2, wherein the shared-account device module calculates a reserved data amount necessary to prevent the total amount of exchanged data from exceeding the maximum amount of data based on a current amount of data available and the maximum amount of data.

5. The mobile device data allocation system of claim 4, wherein the current amount of data available is a difference between a current accumulation of exchanged data among the plurality of mobile devices and the maximum amount of data.

6. The mobile device data allocation system of claim 4, wherein the shared-account device module regulates data transmission of the at least one mobile device in response to controlling at least one of the mobile device to throttle data exchanged via the network and prevent data exchange so as to attain the reserved data amount.

7. The mobile device data allocation system of claim 1, wherein the shared-account device module is installed in a cloud computing network.

8. The mobile device data allocation system of claim 1, wherein the shared-account device module is installed locally on a mobile device among the plurality of mobile devices.

9. A mobile device included in a shared data account, the mobile device comprising:

An electronic device hardware processor configured to control data exchange to and from the mobile device via a communication network control by a data service provider that provides the shared data account with a maximum amount of data available for exchanging during a time period; and an electronic device share-account device module configured to generate a control signal that controls the electronic hardware processor so as to regulate the data exchange in response to determining an upcoming event indicating a total amount of data exchange by at least one mobile device assigned to the shared data account will exceed the maximum amount of data;

wherein the shared-account device module determines the upcoming event based on at least one of metadata and data usage history of a respective mobile device among the plurality of mobile devices.

10. The mobile device of claim 9, wherein the metadata indicates the upcoming event scheduled at a future time period, and wherein the shared-account device module predicts the data exchange performed by the mobile device will increase during the upcoming event.

11. The mobile device of claim 10, wherein the shared-account device module predicts the data exchange increase based on a comparison between the upcoming event and the data usage history.

12. The mobile device of claim 10, wherein the shared-account device module determines a remaining amount of data available for exchanging among the maximum amount of data, and calculates a reserved data amount necessary to prevent the shared account from exchanging a total amount of data from that exceeds the maximum amount of data.

13. The mobile device of claim 12, wherein the current amount of data available is a difference between a current accumulation of exchanged data by the shared data account and the maximum amount of data.

14. The mobile device of claim 12, wherein the shared-account device module regulates data exchange of the mobile device based on a least one of throttling data exchange and preventing data exchange so as to attain the reserved data amount.

15. A non-transitory computer program product to control a mobile device data allocation system so as to regulate data exchange of at least one mobile device assigned to a shared data account, the computer program product comprising a computer readable storage medium having program instruction embodied therewith, the program instructions executable by an electronic computer processor such that the mobile device data allocation system performs operations comprising:

exchanging data via a plurality of mobile devices in signal communication with a data network controlled by a data service provider, the data exchanged during the time period defining a total amount of exchanged data; and determining a maximum amount of data at which the plurality of mobile device are authorized to exchange during the time period; and controlling at least one mobile device among the plurality of devices so as to regulate data exchange of the at least one mobile device in response to determining an upcoming even indicating the total amount of exchanged data will exceed the maximum amount of data;

wherein the shared-account device module determines the upcoming event based on at least one of metadata and data usage history of a respective mobile device among the plurality of mobile devices.

16. The computer program product of claim 15, wherein the operations further comprise predicting the data exchange performed by the respective mobile device will increase during the upcoming event.

17. The computer program product of claim 16, wherein the operations further comprise calculating a reserved data amount necessary to prevent the total amount of exchanged data from exceeding the maximum amount of data based on a current amount of data available and the maximum amount of data.

* * * * *